United States Patent
Miyama et al.

(10) Patent No.: US 10,836,897 B2
(45) Date of Patent: Nov. 17, 2020

(54) RESIN COMPOSITION FOR ORGAN MODELS

(71) Applicant: DENKA COMPANY LIMITED, Tokyo (JP)

(72) Inventors: Akira Miyama, Tokyo (JP); Yoshihiko Tsujimura, Tokyo (JP); Toru Arai, Tokyo (JP)

(73) Assignee: DENKA COMPANY LIMITED, Tokyo (JP)

(*) Notice: Subject to any disclaimer, the term of this patent is extended or adjusted under 35 U.S.C. 154(b) by 51 days.

(21) Appl. No.: 15/753,020

(22) PCT Filed: Aug. 17, 2016

(86) PCT No.: PCT/JP2016/074004
§ 371 (c)(1),
(2) Date: Feb. 15, 2018

(87) PCT Pub. No.: WO2017/030145
PCT Pub. Date: Feb. 23, 2017

(65) Prior Publication Data
US 2018/0244912 A1    Aug. 30, 2018

(30) Foreign Application Priority Data

Aug. 19, 2015 (JP) .................. 2015-161646

(51) Int. Cl.
| | |
|---|---|
| C08L 53/00 | (2006.01) |
| G09B 23/30 | (2006.01) |
| C08L 91/00 | (2006.01) |
| C08L 53/02 | (2006.01) |

(52) U.S. Cl.
CPC ........... C08L 53/005 (2013.01); C08L 53/025 (2013.01); C08L 91/00 (2013.01); G09B 23/30 (2013.01); C08L 2203/02 (2013.01); C08L 2205/16 (2013.01); C08L 2207/322 (2013.01)

(58) Field of Classification Search
None
See application file for complete search history.

(56) References Cited

U.S. PATENT DOCUMENTS

| | | | | |
|---|---|---|---|---|
| 6,509,412 B1* | 1/2003 | Hall | ........................ | C08L 53/02 524/504 |
| 8,262,092 B2 | 9/2012 | Koh et al. | | |
| 2004/0068040 A1* | 4/2004 | Chen | ........................ | C08K 5/01 524/481 |
| 2007/0116766 A1* | 5/2007 | Amick | .................... | A61L 27/52 424/486 |
| 2009/0263604 A1* | 10/2009 | Arai | ....................... | C08F 210/02 428/36.9 |
| 2012/0028231 A1* | 2/2012 | Misawa | ................. | G09B 23/30 434/267 |
| 2014/0298886 A1 | 10/2014 | Nishi | | |

FOREIGN PATENT DOCUMENTS

| | | | |
|---|---|---|---|
| CN | 101845193 | A | 9/2010 |
| JP | H07175407 | A | 7/1995 |
| JP | H09208836 | A | 8/1997 |
| JP | 2002-317096 | A | 10/2002 |
| JP | 2007316434 | A | 12/2007 |
| JP | 2008241988 | A | 10/2008 |
| JP | 2010178809 | A | 8/2010 |
| KR | 20040040763 | A | 5/2004 |
| WO | 2010095519 | A1 | 8/2010 |
| WO | 2013077077 | A1 | 5/2013 |
| WO | 2015194378 | A1 | 12/2015 |

OTHER PUBLICATIONS

Product Information Sheet for Septon, p. 1-12.*
Extended European Search Report issued in application No. 16837134.2 dated Aug. 1, 2018; 7 pages.
International Search Report issued in International Application No. PCT/JP2016/074004 dated Oct. 25, 2016; 4 pages.

* cited by examiner

Primary Examiner — Robert T Butcher
(74) Attorney, Agent, or Firm — Pearne & Gordon LLP

(57) ABSTRACT

[Problem] To provide a thermoplastic resin composition for use in an organ model, wherein said composition has a softness closer to that of an organ, a high mechanical strength, and a texture close to an organ, exhibits excellent durability, and can be handled easily. [Solution] A resin composition for an organ model, said composition containing, as component (A), 100 parts by mass of a hydrogenated block copolymer having an MFR (measured at a temperature of 230° C. and a load of 2.16 kg) of 1 g/10 min. or less, and an oil as component (B). Moreover, the composition may also contain a cross copolymer as component (C), a polypropylene resin as component (D), and a filler as component (E).

7 Claims, No Drawings

RESIN COMPOSITION FOR ORGAN MODELS

TECHNICAL FIELD

The present invention pertains to a resin composition used in an organ model. The present invention pertains to a thermoplastic resin composition used in the field of training, etc. of physicians and technicians to improve, for example, surgical techniques such as incisions and suturing incisions on a human body, etc.

TECHNICAL BACKGROUND

Among operations performed by surgeons, in surgery on organs such as the heart in which resection tools such as a surgical scalpel are used, if the depth of an incision made due to such surgery is too deep, the incision may be fatal, therefore, such work demands careful and adept techniques, and it is not an overstatement to say that the skill level of these techniques has direct consequences on the outcome of a surgical procedure.

Conventionally, since it is impossible to use a living body to practice for surgery on human internal organs, the internal organs of animals such as pigs have generally been used. However, freshness is demanded of the internal organs of animals. Further, in addition to a concern that, if a person doing surgical practice is injured, the person may be infected from a wound with disease-causing bacteria included in the internal organ of an animal, hygiene management of the surgical resection tools and disposal of the used internal organs require a great cost. Conducting surgical practice using konjac instead of an internal organ of a living body has also been considered, but since the feel of cutting and the texture of konjac is very different to the feel of cutting and the texture of a human body, this cannot be said to be suitable for surgical practice.

At this point, instead of a living body, using an organ model made to resemble an organ of a living body can be considered. Models comprising soft resin materials such as, for example, silicone, urethane elastomer, styrene elastomer, which are so-called dry materials, have been proposed as organ models (see Patent Document 1). However, since the feel of cutting and the texture of these materials is very different to the feel of cutting and the texture of a human body, this cannot be said to be suitable for surgical practice. As the softness of these materials approaches that of an organ of a living body, there are problems such as the mechanical strength of the material significantly decreasing and the durability decreasing, so, for example, tearing occurs easily from a section surface where an incision was made with a scalpel. Conventional styrene-based elastomers have a problem in that, when the blended amount of oil for bringing the softness of the elastomer closer to that of an organ increases, leakage of the oil (bleed out) occurs during storage. Silicones and urethane elastomers are post-curing, and have a problem of low productivity due to time taken until cured. Moreover, when creating an organ model by casting in a mold comprising an inner mold and an outer mold, it is necessary to make a cut when taking out the inner mold, but there is a problem in that it is difficult to re-adhere cuts in these post-curing resins. Adhering is possible if a specific adhesive is used, but since adhesives are hard compared to the organ model material, there is a problem in that the texture after adhesion is different.

As a substance to be used instead of a human body, using a model of a living body soft tissue has been proposed, said tissue being obtained by injecting, into a mold for casting a living body soft tissue, a solution in which individual or two kinds of polyvinyl alcohol have been dissolved, afterwards forming into a gel by cooling, and then taking the obtained aqueous gel composition from the casting mold (see, for example, Patent Document 2). These are known as so-called wet materials which include corresponding amounts of components.

However, in these models of living body soft tissue, since in many cases two kinds of polyvinyl alcohol are needed as raw materials at the production stage thereof, preparing this composition is complicated. Further, since the highly toxic dimethylsulfoxide is needed as a solvent, there is a problem that a complicated operation of ethanol substitution and water substitution is required to remove the dimethylsulfoxide. Since polyvinyl alcohol-based materials need to maintain a constant moisture content, management of moisture levels and management of moisture content are required during storage, and a countermeasure to prevent the occurrence of decomposition, mold, etc., for example, refrigerated storage, is needed, and long-term storage is difficult, meaning that in many cases, usage term is limited to several weeks.

Accordingly, in recent years, it is desirable to develop a material for an organ model which has a softness, texture, etc. closely resembling an internal organ of a human, which exhibits excellent mechanical strength and durability, which can suitably be used in surgical practice for the internal organ of a human, and in which a so-called dry material that does not include moisture is used.

Disclosed are a lesion model which is arranged in a luminal part of a vessel having a luminal part (Patent Document 3) and a living body model for training which is of a shape having a narrowed or blocked part in the course of a tubular body that has a luminal part, and provided with a pseudo-lesion member simulating a lesion occurring in a tubular tissue, wherein at least part of the pseudo-lesion member is configured from a plastically deformable material and the living model for training is used in dilation training for performing dilation (Patent Document 4). However, regarding the material used, there are only general descriptions, and there are no descriptions concerning the properties thereof such as MFR, bleed out, etc.

PRIOR ART DOCUMENTS

Patent Documents

[Patent Document 1] JP 2008-241988 A
[Patent Document 2] JP 2007-316434 A
[Patent Document 3] JP 2010-178809 A
[Patent Document 4] WO 2010/095519 A

SUMMARY OF THE INVENTION

Problem to be Solved by the Invention

The present invention was created in consideration of the abovementioned conventional techniques. The objective of the present invention is to provide a resin composition: which has, for example, a similar elasticity (softness) as an internal organ of a human; in which, when an incision is made, the incision section spreads as with an internal organ; which has a cutting feel and texture that resembles that of an internal organ of a human; which exhibits excellent softness, mechanical strength, and durability; and which can suitably be used in surgical practice using a surgical resection tool such as a surgical scalpel and surgical practice such as clipping.

Means for Solving the Problem

The present invention is: a resin composition for an organ model, wherein said composition comprises 100 parts by mass of a hydrogenated block copolymer having an MFR of 1 g/10 min. or less (measured at a temperature of 230° C. with a load of 2.16 kg) as a component (A) and oil as a component (B). Said resin composition for an organ model further comprises a cross copolymer as a component (C). Said resin composition for an organ model further comprises a polypropylene resin as a component (D). Said resin composition for an organ model further comprises, as a component (E), an inorganic filler which is a component (E-1). Said resin composition for an organ model further comprises, as a component (E), an organic fibrous filler which is a component (E-2). Further, said resin composition for an organ model is a thermoplastic resin composition.

Effects of the Invention

The present invention provides a resin composition which, for example, has a softness and feel closer to that of an organ of a living body, which has high mechanical strength, which exhibits excellent durability, and which can be handled easily.

MODES FOR CARRYING OUT THE INVENTION

<Component (A): Hydrogenated Block Copolymer>

The hydrogenated block copolymer used in the present invention is preferably a hydrogenated product (hydrogen additive or hydride) of an aromatic vinyl-conjugated diene block copolymer comprising a block polymer unit (X) derived from an aromatic vinyl and a block polymer unit (Y) derived from a conjugated diene.

The form of an aromatic vinyl-conjugated diene block copolymer having such a configuration is represented by, for example, $X(YX)_n$ or $(XY)_n$ (where n is an integer of 1 or more).

Among these, a form of $X(YX)_n$, and in particular, X-Y-X is preferred. As an X-Y-X form, at least one kind of copolymer selected from the group consisting of a polystyrene-polybutadiene-polystyrene block copolymer, a polystyrene-polyisoprene-polystyrene block copolymer, a polystyrene-polyisoprene butadiene-polystyrene block copolymer is preferred.

In such an aromatic vinyl-conjugated diene block copolymer, an aromatic vinyl block unit (X), which is a hard segment, is present as a cross-linking point of a conjugated diene rubber block unit (Y) and forms a pseudo cross-link (domain). This conjugated diene rubber block unit (Y) that is present between the aromatic vinyl block units (X) is a soft segment and exhibits rubber elasticity.

Styrene, α-methyl styrene, 3-methyl styrene, p-methyl styrene, 4-propyl styrene, 4-dodecyl styrene, 4-cyclohexyl styrene, 2-ethyl-4-benzyl styrene, 4-(phenylbutyl) styrene, 1-vinylnaphthalene, 2-vinylnaphthalene, etc. are provided as examples of an aromatic vinyl that forms a block polymer unit (X). Among these, styrene is preferred.

Butadiene, isoprene, pentadiene, 2, 3-dimethyl butadiene and combinations thereof are provided as examples of a conjugated diene that forms a block polymer unit (Y).

Among these, at least one conjugated diene selected from the group consisting of butadiene, isoprene, and a combination of butadiene and isoprene (copolymerization of butadiene and isoprene) is preferred. Among these, a combination of one or more conjugated dienes may be used. The conjugated diene block polymer unit (Y) comprising a copolymer unit of butadiene and isoprene may be any of a random polymer unit of butadiene and isoprene, a block polymer unit thereof, and a tapered polymer unit thereof.

In aromatic vinyl-conjugated diene block copolymers such as above, it is preferable that the content of aromatic vinyl block polymer units (X) is from 5 to 50 mass %, inclusive, and more preferably, from 20 to 40 mass %, inclusive. The content of this aromatic vinyl unit can be measured by a normal method such as infrared spectroscopy, NMR spectroscopy, etc. The melt flow rate (MFR (temperature 230° C., load 2.16 kg)) of component (A) is 1 g/10 min. or less, and preferably less than 0.1 g/10 min. MFR (temperature 230° C., load 2.16 kg) means MFR measured in compliance with JIS K7210 under conditions of a temperature of 230° C. and a load of 2.16 kg. If MFR is higher than this value, when oil is added, bleed outs occur more easily and mechanical strength decreases.

Aromatic vinyl-conjugated diene block copolymers such as the above can be produced by various methods. (1) A method of consecutively polymerizing an aromatic vinyl and then a conjugated diene using an alkyl lithium compound such as n-butyllithium as an initiator, (2) a method of polymerizing an aromatic vinyl, and then a conjugated diene and coupling the same by means of a coupling agent, and (3) a method of consecutively polymerizing a conjugated diene, and then an aromatic vinyl using a lithium compound as an initiator, etc. are provided as examples of production methods.

The hydrogenated block copolymer used in the present invention is a product (hydrogen additive or hydride) of such an aromatic vinyl-conjugated diene block copolymer as above hydrogenated by a publicly-known method, wherein the preferred hydrogenation rate is 90 mol % or more. This hydrogenation rate is a value when the entire amount of double carbon-carbon bonds in the conjugated diene block polymer unit (Y) is set at 100 mol %. A hydrogenation rate of 90 mol % or more indicates that 90 mol % or more of the carbon-carbon double bonds are hydrogenated. Polystyrene-poly(ethylene/propylene) block (SEP), polystyrene-poly(ethylene/propylene) block-polystyrene (SEPS), polystyrene-poly(ethylene/butylene) block-polystyrene (SEBS), polystyrene-poly(ethylene-ethylene/propylene) block-polystyrene (SEEPS), etc. are provided as examples of such a hydrogenated block polymer unit (A).

More specifically, SEPTON (manufactured by Kuraray Co. Ltd.), Kraton (manufactured by Shell Chemicals), Kraton G (manufactured by Shell Chemicals), Tuftec (manufactured by Asahi Kasei Corp.) (all of the above are product names) etc. are provided as examples.

The hydrogenation rate is measured by a publicly-known method such as nucleic magnetic resonance (NMR) spectroscopy.

In the present invention, SEEPS is preferred as the hydrogenated block polymer unit (A). From the perspective of oil absorption work before kneading, it is preferable that the form of the hydrogenated block polymer unit (A) is a powder or an amorphous (crumb) form.

<Component (B): Oil>

Mineral oil-based oils such as paraffinic process oil, naphthenic process oil, aromatic process oil and liquid paraffin, and silicon oil, castor oil, linseed oil, olefinic wax, mineral wax, etc. are provided as examples of the oil which is component (B). Among these, a paraffinic and/or naphthenic process oil is preferred. Diana Process Oils (manufactured by Idemitsu Kosan Co., Ltd.), JOMO Process P (manufactured by Japan Energy Corporation), etc. are provided as examples of the process oil.

The oil which is component (B) is used, for example, to soften the resin composition so that the elasticity and hardness of an organ model can be adjusted. A combination of one or more oils of the above oils may be used.

From a perspective of workability, it is preferable that the oil which is component (B) is absorbed in advance in the hydrogenated block copolymer that is component (A).

It is preferable that, with respect to 100 parts by mass of the hydrogenated block copolymer which is component (A), the usage amount of the oil which is component (B) is 100 parts by mass or more. With respect to 100 parts by mass of the hydrogenated block copolymer which is component (A), the usage amount of the oil which is component (B) is 1,000 parts by mass or less, preferably 700 parts by mass or less, more preferably 500 parts by mass or less, even more preferably 400 parts by mass or less, even further preferably 300 parts by mass or less, and most preferably 280 parts by mass or less. The usage amount of the oil is to be adjusted within the range described above according to the site and lesion of the actual organ on which the model is based. When, with respect to 100 parts by mass of the hydrogenated block copolymer which is component (A), the usage amount of the oil which is component (B) is less than 100 parts by mass, the softness thereof may be insufficient, and when said usage amount exceeds 1,000 parts by mass, since the oil cannot be stored, a compound cannot be formed. When the oil exceeds 500 parts by mass, the oil may leak (bleed out).

<Component (C): Cross Copolymer>

The cross copolymer which is component (C) is a copolymer obtained by a production method comprising a coordination polymerization step followed by an anion polymerization step or a radical polymerization step. A specific example of the production method for the cross polymer is described below. First, in the coordination polymerization step, using a single site coordination polymerization catalyst, an olefin-aromatic vinyl-aromatic polyene copolymer is produced from an olefin, an aromatic vinyl, and an aromatic polyene. Next, a cross copolymer is obtained by performing anion polymerization or radial polymerization in the coexistence of the olefin-aromatic vinyl-aromatic polyene copolymer and an aromatic vinyl monomer. Further, the cross copolymer is a copolymer having an olefin-aromatic vinyl-aromatic polyene copolymer chain (which may also be disclosed as a main chain) and an aromatic vinyl polymer chain (which may also be disclosed as a side chain). A cross copolymer and a production method therefor is disclosed in WO 2000/37517, U.S. Pat. No. 6,559,234, WO 2007/139116, and JP 2009-120792. By using a cross copolymer which is component (C), the texture of the organ model can approach that of an organ of a living body.

Here, styrene and various kinds of substituted styrenes, for example, p-methylstyrene, m-methylstyrene, o-methylstyrene, o-t-butylstyrene, m-t-butylstyrene, p-t-butylstyrene, p-chlorostyrene, o-chlorostyrene, etc. are provided as examples of the aromatic vinyl. Among these, from an industrial perspective, at least one aromatic vinyl selected from the group consisting of styrene, p-methylstyrene, and p-chlorostyrene is preferable, with styrene being the most preferable. Among these, a combination of one or more aromatic vinyls may be used.

Here, ethylene, a $C_{3-20}$ α-olefin, etc. are provided as examples of the olefin.

Propylene, 1-butene, 1-hexene, 4-methyl-1-pentene, and 1-octene are provided as examples of the $C_{3-20}$ α-olefin. In the present invention, cyclic olefin is also included in category of olefins. Vinyl cydohexene, cydopentene, norbornene, etc. are provided as examples of the cyclic olefin. Among these, at least one olefin selected from the group consisting of ethylene, propylene, 1-butene, 1-hexene, and 1-octene is preferable, with ethylene being more preferable. Among these, a combination of one or more olefins may be used.

Here, the aromatic polyene means an aromatic polyene which has a carbon number of 10-30, has a plurality of double bonds (vinyl group) and a single or a plurality of aromatic groups, and is a monomer which can be coordination polymerized, wherein, in a polymerized state in which one of the double bonds (vinyl group) is used in coordination polymerization, the remaining double bonds can be anion polymerized. Among these, divinylbenzene is preferable, and as the divinylbenzene, at least one kind comprising ortho-divinylbenzene, para-divinylbenzene, meta-divinylbenzene is preferable. Among these, a combination of one or more kinds may be used.

The cross copolymer used most preferably in the present invention is a copolymer which is obtained by performing anion polymerization, in the coexistence of an ethylene-styrene-divinylbenzene copolymer obtained by coordination polymerization and a styrene monomer, and which has an ethylene-styrene-divinylbenzene copolymer chain (which may also be disclosed as a main chain, and is a soft component) and a polystyrene chain (which may also be disclosed as a side chain, and is a hard component). In particular, the softness of the cross copolymer is determined by various parameters such as: the content of styrene in the ethylene-styrene-divinylbenzene copolymer chain which is a soft polymer chain component (soft segment) thereof; the ratio of soft components and hard components included; the content of the divinylbenzene component which bonds the soft component chain and the hard component chain; and the molecular flowability (MFR value) of the entire cross copolymer defined by the molecular weight of the ethylene-styrene-divinylbenzene copolymer chain and the polystyrene chain and the content of divinylbenzene. The storage elastic modulus of the resin composition of the present invention decreases as the styrene content of the ethylene-styrene-divinylbenzene copolymer chain becomes higher and the crystallinity of the ethylene chain decreases, or as the content of the ethylene-styrene-divinylbenzene copolymer chain which is a soft component increases.

More preferably, the cross copolymer satisfies all conditions (1) to (3) below.

(1) The content of aromatic vinyl compound units in the ethylene-aromatic vinyl compound-aromatic polyene copolymer is 5 mol % or higher and less than 40 mol %, the aromatic polyene unit content is 0.01 mol % or higher and 0.2 mol % or lower, and the balance is ethylene unit content.

(2) The weight average molecular weight of the ethylene-aromatic vinyl compound-aromatic polyene copolymer is 50,000 or higher and 300,000 or lower, and the molecular weight distribution (Mw/Mn) is 1.8 or higher and 6 or lower, and preferably 1.8 or higher and 3 or lower.

(3) The content of the ethylene-aromatic vinyl compound-aromatic polyene copolymer included in the cross copolymer is in the range of 40 mass % to 90 mass %.

The most preferable cross copolymer in the present invention is a cross copolymer, disclosed in WO 2007/139116 and JP 2009-120792, having an A hardness (hardness according to a durometer A) of 50 to 80.

The cross copolymer used in the present invention is described below. The present cross copolymer is a copolymer having an ethylene-aromatic vinyl compound-aromatic polyene copolymer chain and an aromatic vinyl compound polymer chain, said cross copolymer being characterized in that the ethylene-aromatic vinyl compound-aromatic polyene copolymer chain and the aromatic vinyl compound polymer chain are bonded via an aromatic polyene unit. That the ethylene-aromatic vinyl compound-aromatic polyene copolymer chain and the aromatic vinyl compound polymer chain are bonded via an aromatic polyene unit can be proven by the observable phenomenon below. Here, a representative example is shown in which an ethylene-styrene-divinylbenzene copolymer chain and a polystyrene chain are bonded via a divinylbenzene unit. That is, the $^1$H-NMR (proton NMR) of an ethylene-styrene-divinylbenzene copolymer obtained by a coordination polymerization step, and of a cross copolymer obtained by anion polymerization of the ethylene-styrene-divinylbenzene copolymer in the presence of a styrene monomer are measured and are compared using a peak intensity of vinyl group hydrogen (proton) of the divinylbenzene units of both as an appropriate internal reference peak (appropriate peak derived from the ethylene-styrene-divinylbenzene copolymer). Here, the peak intensity (surface area) of the vinyl group hydrogen (proton) of the divinylbenzene units of the cross copolymer is less than 50% compared to the same peak intensity (surface area) of the divinylbenzene units of the ethylene-styrene-divinylbenzene copolymer, and more preferably less than 20%. During the anion polymerization (cross-polymerization step) the divinylbenzene units are also copolymerized at the same time as polymerization of the styrene monomer, and since the ethylene-styrene-divinylbenzene copolymer chain is bonded to the polystyrene chain via a divinylbenzene unit, the peak intensity of the hydrogen (photon) of the divinylbenzene units greatly decreases in the cross copolymer after anion polymerization. In fact, the peak of the hydrogen (proton) of the vinyl group of the divinylbenzene unit is substantially eliminated in the cross copolymer after anion polymerization. The details are disclosed in the publicly-known document "*Branching Copolymer Synthesis from Divinylbenzene-containing Olefinic Terpolymer*", ARAI, Tooru, HASEGAWA Masaru, The Society of Rubber Science and Technology, Japan Journal, p. 382, vol. 82 (2009).

From a different perspective, that the ethylene-aromatic vinyl compound-aromatic polyene copolymer chain and the aromatic vinyl compound polymer chain are bonded via an aromatic polyene unit in the present cross copolymer can be proven by the observable phenomenon below (as an example, an ethylene-styrene-divinylbenzene copolymer chain is bonded to a polystyrene chain via a divinylbenzene unit). That is, even after a Soxhlet extraction has been performed on the present cross copolymer adequate times using an appropriate solvent, the ethylene-styrene-divinylbenzene copolymer chain and the polystyrene chain which are included cannot be separated. Normally, by performing a Soxhlet extraction with boiling acetone, an ethylene-styrene-divinylbenzene copolymer having an identical composition to the ethylene-styrene-divinylbenzene copolymer chain included in the present cross copolymer and polystyrene can be separated into an ethylene-styrene-divinylbenzene copolymer as an acetone insoluble component and a polystyrene as an acetone soluble component. However, when a similar Soxhlet extraction was performed on the present cross copolymer, a relatively small amount of a polystyrene homopolymer included in a cross copolymer as an acetone insoluble component could be obtained, but performing an NMR measurement on the acetone insoluble component which accounted for the majority of the volume, indicated that an ethylene-styrene-divinylbenzene copolymer chain and a polystyrene chain are both included, so it is understood that these cannot be separated by a Soxhlet extraction. Details of this are disclosed in the publicly-known document "*Branching Copolymer Synthesis from Divinylbenzene-containing Olefinic Terpolymer*", ARAI, Tooru, HASEGAWA Masaru, The Society of Rubber Science and Technology, Japan Journal, p. 382, vol. 82 (2009).

From the above, as an expression defining the cross copolymer used in the present invention, component (C): a cross copolymer is a copolymer having an ethylene-aromatic vinyl compound-aromatic polyene copolymer chain and an aromatic vinyl compound polymer chain, the ethylene-aromatic vinyl compound-aromatic polyene copolymer chain and the aromatic vinyl compound polymer chain being bonded via an aromatic polyene unit.

More preferably, the copolymer satisfies all conditions (1) to (3) below.

(1) The content of aromatic vinyl compound units in the ethylene-aromatic vinyl compound-aromatic polyene copolymer is 5 mol % or higher and less than 40 mol %, the aromatic polyene unit content is 0.01 mol % or higher and 0.2 mol % or lower, and the balance is ethylene units.

(2) The weight average molecular weight of the ethylene-aromatic vinyl compound-aromatic polyene copolymer is 50,000 or higher and 300,000 or lower, and the molecular weight distribution (Mw/Mn) is 1.8 or higher and 6 or lower, and preferably 1.8 or higher and 3 or lower.

(3) The content of the ethylene-aromatic vinyl compound-aromatic polyene copolymer included in the cross copolymer is in the range of 40 mass % to 90 mass %.

The present cross copolymer shall be explained from a further different perspective. The present cross copolymer is obtained by a production method including a polymerization step comprising a coordination polymerization step and a cross-polymerization step, wherein as the coordination polymerization step, an ethylene-aromatic vinyl compound-aromatic polyene copolymer is synthesized by performing copolymerization of an ethylene monomer, an aromatic vinyl compound monomer and an aromatic polyene using a single site coordination polymerization catalyst, and next as a cross-polymerization step, the cross copolymer is produced by anion polymerization, via an anion polymerization initiator, in the coexistence of said ethylene-aromatic vinyl compound-aromatic polyene copolymer and an aromatic vinyl compound monomer. As the aromatic vinyl compound monomer used in the cross-polymerization step, the unreacted monomer remaining in the polymerization liquid of the coordination polymerization step may be used, or an aromatic vinyl compound monomer may be newly added to said liquid. By adding the anion polymerization initiator to the polymerization liquid, polymerization starts but in this case, anion polymerization starts substantially from the aromatic vinyl compound monomer which, compared to the aromatic polyene units of the ethylene-aromatic vinyl compound-aromatic polyene copolymer, is included in the polymerization liquid in an overwhelmingly large amount, and while the aromatic vinyl compound monomer polymerizes, the vinyl group of the aromatic polyene unit of the ethylene-aromatic vinyl compound-aromatic polyene copolymer also copolymerizes and polymerization progresses. Due to the above, the cross copolymer that is obtained is thought to include a structure in which the ethylene-aromatic vinyl compound-aromatic polyene copolymer, which is the main chain, and the aromatic vinyl compound chain, which is the cross chain, are bonded in a graft through form (cross-linked).

From the above, as an expression defining the cross copolymer used in the present invention, component (C): a cross copolymer is a graft-through copolymer of an ethylene-aromatic vinyl compound-aromatic polyene copolymer chain and an aromatic vinyl compound copolymer chain, the ethylene-aromatic vinyl compound-aromatic polyene copolymer chain and the aromatic vinyl compound polymer chain are bonded via an aromatic polyene unit, and further, conditions (1) to (3) below are all satisfied.

(1) The content of aromatic vinyl compound units in the ethylene-aromatic vinyl compound-aromatic polyene copolymer is 5 mol % or higher and less than 40 mol %, the aromatic polyene unit content is 0.01 mol % or higher and 0.2 mol % or lower, and the balance is ethylene units.

(2) The weight average molecular weight of the ethylene-aromatic vinyl compound-aromatic polyene copolymer is 50,000 or higher and 300,000 or lower, and the molecular weight distribution (Mw/Mn) is 1.8 or higher and 6 or lower, and preferably 1.8 or higher and 3 or lower.

(3) The content of the ethylene-aromatic vinyl compound-aromatic polyene copolymer included in the cross copolymer is in the range of 40 mass % to 90 mass %.

It is preferable that, with respect to 100 parts by mass of the hydrogenated block copolymer which is component (A), the usage amount of the cross copolymer which is component (C) is 10 parts by mass or more. With respect to 100 parts by mass of the hydrogenated block copolymer which is component (A), the usage amount of the cross copolymer which is component (C) is preferably 200 parts by mass or less, more preferably 100 parts by mass or less, and even more preferably 50 parts by mass or less. When, with respect to 100 parts by mass of the hydrogenated block copolymer which is component (A), the usage amount of the cross copolymer which is component (C) is more than 200 parts by mass, the elastic recovery of the resin composition may decrease and oil may be more prone to bleed out.

If the cross copolymer, which is component (C), is blended, there are cases in which the hardness of resin of the present invention increases, so it is preferable that, with respect to 100 parts by mass of the hydrogenated block copolymer which is component (A), the usage amount of the oil which is component (B) is 200 parts by mass or more. It is preferable that, with respect to 100 parts by mass of the hydrogenated block copolymer which is component (A), the usage amount of the oil which is component (B) is 700 parts by mass or less, and more preferably 500 parts by mass or less. The usage amount of the oil is to be adjusted within the range described above according to the site and lesion of the actual organ on which the model is based. When, with respect to 100 parts by mass of the hydrogenated block copolymer which is component (A), the usage amount of the oil which is component (B) is less than 200 parts by mass, the softness thereof may be insufficient, and when said usage amount exceeds 700 parts by mass, the oil may leak (bleed out).

<Component D: Polypropylene Resin>

Polypropylene resin, which is component (D), is a polymer having propylene as a main component. It is preferable that, the polypropylene resin which is component (D) is at least one polypropylene selected from the group consisting of a homopolypropylene (homo PP), a block polypropylene (block PP), and a random polypropylene (random PP). Among these, a combination of one or more polypropylenes may also be used. The stereoregularity of the polypropylene resin which is component (D) may be either isotactic and syndiotactic. The polypropylene resin which is component (D) is used to improve the mechanical strength and heat resistance of the resin composition.

It is preferable that, with respect to 100 parts by mass of the hydrogenated block copolymer which is component (A), the usage amount of the polypropylene resin which is component (D) is 5 parts by mass or more. It is preferable that, with respect to 100 parts by mass of the hydrogenated block copolymer which is component (A), the usage amount of the polypropylene resin which is component (D) is 100 parts by mass or less, and more preferably 60 parts by mass or less. If, with respect to 100 parts by mass of the hydrogenated block copolymer which is component (A), the usage amount of the polypropylene resin which is component (D) exceeds 100 parts by mass, the hardness of the resin composition may become excessively high.

If the polypropylene resin which is component (D) is blended, the hardness of the resin composition of the present invention may increase, so it is preferable that, with respect to 100 parts by mass of the hydrogenated block copolymer which is component (A), the usage amount of the oil which is component (B) is 200 parts by mass or more. It is preferable that, with respect to 100 parts by mass of the hydrogenated block copolymer which is component (A), the usage amount of the oil which is component (B) is 700 parts by mass or less, and more preferably 500 parts by mass or less. The usage amount of the oil is to be adjusted within the range described above according to the site and lesion of the actual organ on which the model is based. When, with respect to 100 parts by mass of the hydrogenated block copolymer which is component (A), the usage amount of the oil which is component (B) is less than 200 parts by mass, the softness thereof may be insufficient, and when said usage amount exceeds 700 parts by mass, the oil may leak (bleed out).

<Component (E): Filler>

The filler, which is component (E), can be used to improve the texture and adjust the stretch and stress of the resin composition.

The inorganic filler which is component (E1) and the organic fibrous filler which is component (E2), etc. are provided as examples of the filler which is component (E). Calcium carbonate, talc, day, calcium silicate, magnesium carbonate, magnesium hydroxide, mica, barium sulfate, titanium oxide, aluminum hydroxide, silica, alumina, carbon black, etc. are provided as examples of the inorganic filler which is component (E-1). Among these, at least one selected from the group consisting of calcium carbonate, silica, alumina, talc, and clay is preferable, and calcium carbonate is more preferable.

Conductive fillers such as carbon fibers, carbon nanofibers, carbon nanotubes, coil-shaped carbon fibers, etc., and polyethylene fibers, polypropylene fibers, polyvinyl alcohol fibers (vinylon fibers), nylon fibers and cellulose fibers, wood powder, wood pulp, etc. are provided as examples of the organic fibrous filler which is component (E2).

Among these, at least one selected from the group consisting of vinylon fibers and polyethylene fibers (polyethylene fibers) is preferable. If an organic fibrous filler is used, it is more preferable that the molding temperature thereof is lower than the glass-transition temperature, the crystalline melting point and the decomposition temperature.

If the molding temperature is higher than the glass-transition temperature and the crystalline melting point, it is preferable that the organic fibrous filler be cross-linked beforehand by an electron ray, etc. In the present specification, fiber ("sen-i" in Japanese) and fiber ("faibaa" in Japanese) have the same meaning.

Among the abovementioned inorganic and organic fillers, using a fibrous filler is particularly preferable.

The present fibrous filler is a concept including coil-shape and any other form. Regarding the length of the fibrous filler, 10 µm to 20 mm is preferable, and 100 µm to 10 mm is particularly preferable. The ratio of the length to the fiber diameter is preferably in the range of 10 to 1,000.

With respect to 100 parts by mass of the hydrogenated block copolymer which is component (A), the usage amount of the inorganic filler which is component (E-1) is preferably 10 parts by mass or more and 200 parts by mass or less, and more preferably 10 parts by mass or more and 100 parts by mass or less. With respect to 100 parts by mass of the hydrogenated block copolymer which is component (A), the usage amount of the organic filler which is component (E-2) is 10 parts by mass or more and 100 parts by mass or less, and more preferably 10 parts by mass or more and 30 parts by mass or less.

If the filler which is component (E) is blended, the hardness of the resin composition of the present invention may increase, so it is preferable that, with respect to 100 parts by mass of the hydrogenated block copolymer which is component (A), the usage amount of the oil which is component (B) is 200 parts by mass or more. Surprisingly, by including a filler, preferably a fibrous filler, oil leak (bleed out) is suppressed. Thus, if the filler which is component (E) is blended, it is preferable that, with respect to 100 parts by mass of the hydrogenated block copolymer which is component (A), the usage amount of the oil which is component (B) is 700 parts by mass or less. The usage amount of the oil is to be adjusted within the range described above according to the site and lesion of the actual organ on which the model is based. When, with respect to 100 parts by mass of the hydrogenated block copolymer which is component (A), the usage amount of the oil which is component (B) is less than 200 parts by mass, the softness thereof may be insufficient, and when said usage amount exceeds 700 parts by mass, the oil may leak (bleed out).

Additives, for example, coloring agents such as pigments and dyes, etc., perfumes, antioxidizing agents, antibacterial agents, etc. may be used in a scope that does not inhibit the objective of the present invention. In order to make the organ model of the present invention more closely resemble an organ of a living body, coloring, via a coloring agent, in a color that closely resembles an organ of a living body is preferable.

The resin composition of the present invention does not experience bleed out (leakage) of oil or additives, undergoes a forming process easily, and is soft and has a texture, a practical mechanical strength and a resistance to tearing close to those of an organ of a living body, so is suitable as a thermoplastic resin composition for an organ model.

It is preferable that the thermoplastic resin composition of the present composition described above has, for example, the softness and the mechanical strength such as those described below in order to have the softness and the mechanical strength close to those of an organ.

The E hardness of the resin composition of the present invention is preferably 3-50. The tensile elasticity of the resin composition of the present invention is preferably 0.02-1 MPa. The 50% modulus (stress at 50% elongation in tensile testing) is preferably 0.005-0.3 MPa, and more preferably, 0.03-0.2 MPa. The thread tearing strength, which is a measure of the endurance of the resin composition for an organ model, is preferably 2 N or greater, and more preferably 3 N or greater. The thread tearing elongation of the resin composition of the present invention is preferably 10 mm or more. The residual strain after spring back testing of the resin composition of the present invention is preferably 15% or less.

As organ models, heart, liver, and pancreas are preferable. Organ models of heart, liver, and pancreas are used in training for surgery. Organ models of heart, liver, and pancreas have a problem in that it is difficult to maintain an incision end and a suturing state in mock operations. That is, there are problems of a phenomenon of further tearing, due to mechanical stress while in use, from an end section that has been incised with a scalpel, and a phenomenon of tearing due to tensile force of a thread that was used for suturing. These phenomena are prone to occur since conventional materials do not have sufficient thread tearing strength or elongation. The resin composition of the present invention demonstrates sufficient thread tearing strength and elongation which are of a level equivalent to those of an organ of a living body, in particular an organ of a human, and is therefore preferable as an organ model of a heart, liver, and pancreas. For example, 3D data of an organ for an organ model can be purchased and downloaded from the following sites:

http://www.3dscanstore.com/
http://3dprint.nih.gov/
http://3-d-craft.com/press/2607
http://www.model-wave.com/

Moreover, in addition to the softness and mechanical strength described above, it is preferable for the resin composition of the present invention to have a texture that is close to a living body organ. Here, from a perspective of approaching the texture of a living body organ, a judgment can be made by referring to the opinions of physicians specializing in surgery, and experts engaged in the production of organ models, but the texture can preferably be expressed quantitatively by a maximum static frictional force or a static friction coefficient. It is preferable that at a load of 10 g, the maximum static frictional force is 140 g or more, and the static friction coefficient is 14 or more. Here, the static friction coefficient is shown by maximum static frictional force/load. By satisfying this condition, it is possible to approach the texture of a living body organ in terms of the feeling of moisture, etc. The most preferable blending composition for the present invention satisfying the above condition is a resin composition for an organ model, wherein said composition contains, with respect to 100 parts by mass of a hydrogenated block copolymer as component (A), 100 parts by mass or more and 1,000 parts by mass or less, preferably 700 parts by mass or less, of an oil as component (B), and with the components (A) and (B) in common, further comprises one or a plurality of components selected from components (C), (E-1), and (E-2) below.

The cross copolymer which is component (C) is 10 parts by mass or more and 100 parts by mass or less, and preferably 50 parts by mass or less.

The inorganic filler which is component (E-1) is 10 parts by mass or more and 100 parts by mass or less.

The organic fibrous filler which is component (E-2) is 10 parts by mass or more and 30 parts by mass or less.

An appropriate publicly-known blending method or kneading method may be used to produce the resin composition of the present invention. For example, melt-mixing may be performed by a single screw extruder, a twin screw extruder, a Banbury mixer, Plastomill, Co-Kneader, heating roll, etc. Before melt-mixing is performed, the raw materials may be mixed uniformly by a Henschel mixer, ribbon blender, super mixer, tumbler, etc. The melt-mixing temperature is not limited in particular, but is generally 100-300° C., and preferably 150-250° C.

The resin composition of the present invention can be formed into an organ model by a publicly-known molding method. For example, various molding methods such as extrusion molding, cast molding, injection molding, vacuum molding, blow molding, etc. may be used to match the target organ model. The above demonstrated embodiments of the present invention, but these are examples of the present invention, and configurations other than those described above may be employed.

The resin composition of the present invention is formed into an organ model by a publicly-known molding method, but if using an inner mold (core) and an outer mold, and molding by casting in the cavity therebetween, when the inner mold is taken out, it may be necessary to make a cut in the resin composition and take out the inner mold from there. At that time, in some cases the cut section is adhered to complete the organ model. Further, in injection molding etc., it may be necessary to mold a plurality of organ parts individually, and then complete the organ model by adhering. In the case of an educational organ model, if after incising with a scalpel, etc., the organ can be restored by adhering the incised surface, reuse is possible which is convenient.

Thus, if a resin composition used in an organ model can be easily adhered, the usefulness and convenience thereof increase. Compared to post-curing soft resins (cross-linked soft resins) such as publicly-known urethane resins, etc., the resin composition of the present invention has the advantage of adhering easily to itself or to another material. It is also possible to adhere curable flexible resin by an adhesive agent, but adhesive strength is low, and further, because adhesive agents are generally hard, the texture may deteriorate after adhesion. The resin composition of the present invention has advantages of being thermoplastic and non-cross-linked, being able to be melt-adhered by slight local heating or warming, and further, being able to be strongly adhered by applying an appropriate good solvent and then sticking together the coated surfaces.

At such a time, as a good solvent, an adhesive in which a small amount of component (A) of the resin composition of the present invention has been dissolved may be used.

In such cases, there are no worries about causing the texture to deteriorate after adhesion.

EXAMPLES

Below, examples are shown in order for an understanding of the present invention, but the present invention is not limited to these examples. Unless otherwise specified, the examples were carried out in an atmosphere of 23±1° C.

(1) Ingredients
Component (A)
SEEPS (SEPTON4055, manufactured by Kuraray Co., Ltd.), MFR (temperature 230° C., load 2.16 kg) 0.0 g/10 minutes (0.0 g/10 minutes means there is no flow), styrene content 30 mass %, hydrogenation ratio 90 mol % or more.
SEEPS (SEPTON4033, manufactured by Kuraray Co., Ltd.), MFR (temperature 230° C., load 2.16 kg) 0.1 g/less than 10 minutes, styrene content 30 mass %, hydrogenation ratio 90 mol % or more.
SEEPS (SEPTON-J3341, manufactured by Kuraray Co., Ltd.), MFR (temperature 230° C., load 2.16 kg) 0.0 g/10 minutes (0.0 g/10 minutes means there is no flow), styrene content 40 mass %, hydrogenation ratio 90 mol % or more.
Comparison component (A)
SEPS (SEPTON2007, manufactured by Kuraray Co., Ltd.), MFR (temperature 230° C., load 2.16 kg) 2.4 g/10 minutes, styrene content 30 mass %, resin form: crumb.
Component (B) Paraffin oil (PW-90, manufactured by Idemitsu Kosan Co., Ltd.)
Component (C) Cross copolymer (manufactured by Denka Co., Ltd.), main chain styrene content 17 mol %, divinylbenzene content 0.05 mol %, main chain molecular weight Mw 101,000, Mw/Mn=2.2, ratio of main chain ethylene-styrene-divinylbenzene copolymer included in cross copolymer is 82 mass %, A hardness 70
Component (D) Polypropylene (HomoPP, Homopolypropylene J106G, manufactured by Prime Polymer Co., Ltd.)
Component (E-1)
Calcium carbonate (NS #100, manufactured by Nitto Funka Kogyo)
Component (E-2)
Polyethylene fiber (PE fiber) (Kemibesto FDSS-2 (fiber length 0.6 mm), manufactured by Mitsui Chemicals, Inc.)
Vinylon fiber (Vinylon fiber RM 182 (fiber length 4 mm) manufactured by Kuraray Co., Ltd.)

(2) Kneading Method

The hydrogenated block copolymer (SEPTON4055, etc.), which is component (A), is supplied from the maker as an amorphous powder. Several days before kneading, a prescribed amount of oil was dripped onto the hydrogenated block copolymer and allowed to sufficiently infiltrate. A Brabender Plasti-Corder (PL2000, manufactured by Brabender GmbH) was used, the raw materials were introduced, and a sample was produced by kneading for six minutes at 180° C. and a rotation speed of 50 rpm.

(3) Method for Creating a Test Piece

Production of a sample sheet was as below.

Specimens for a physical property assessment used sheets of various thickness (1.0 mm, 5.0 mm) formed by a heating press method (180° C., 5 minutes, pressure 50 kg/cm$^2$).

(4) E Hardness 5.0 mm sheets were overlapped, and the type E durometer hardness was determined at a condition of 23±1° C. in compliance with the plastic durometer hardness test method of JIS K7215.

This hardness was a momentary value.

(5) Tensile Test (Tensile Elasticity, 50% Modulus)

In compliance with JISK6251, a 1.0 mm thick sheet was cut into a No. 2 No. 1/2 type test piece shape and using a Shimazdu AGS-100D type tensile tester, was measured at a tensile speed of 100 mm/min under conditions of 23±1° C. The tensile elasticity in the present invention is the initial tensile elasticity.

(6) Thread Tearing Test (Thread Tearing Strength, Thread Tearing Elongation)

A surgical use thread (Blade Silk No. 3) was passed through a sheet having a length of 35 mm, a width of, 25 mm, and a thickness of 1.0 mm, in a position 5 mm in the longitudinal direction and 12.5 mm in the lateral direction, the thread was then pulled at a speed of 100 mm/min, and strength and elongation until the sheet tore were measured.

(7) Spring Back Test (Residual Stress after Spring Back Test)

A sheet having a length of 75 mm, a width of 25 mm, and a thickness of 1.0 mm was stretched 50% at a tensile speed of 100 mm/min with a distance between chucks of 25 mm, and maintained for 30 seconds, and afterwards the elongation when the load was returned to zero at a speed of 100 mm/min was evaluated as the residual stress.

(8) Texture (Texture Sense Test)

The texture was observed by four people who were physicians specializing in surgery and personnel engaged in the manufacture of organ models, and was evaluated on the basis of the evaluation criteria below (each person gave an evaluation from 0 to 2). A total score from the four people of four points or higher was regarded as a pass, and six points or more was regarded as an excellent texture.

(Assessment Criteria)

A: Two points. Sufficiently closely resembles a living body organ.

B: One point. Closely resembles a living body organ to some extent.

C: Zero points. Does not closely resemble a living body organ.

(9) Texture Evaluation

A sheet having a thickness of 1.0 mm was used in the texture evaluation.

Using a Tribomaster Type TL201Ts manufactured by Trinity Lab Co., Ltd. fitted with a finger model sensory contact, measurement was performed at a load of 10 g, a speed of 10 mm/sec., a data reading speed of 1 millisec., and a measurement length of 30 mm, the relationship of friction force to time was measured, and the maximum static friction force and static friction coefficient were determined.

(10) Adhesiveness Test

1. In an edge face adhesiveness test, a tensile test of two sheets was conducted by adhering, at an edge face measuring 5 mm×25 mm, two sheets having one side of 25 mm and a thickness of 5 mm.

2. In a shear force test, a tensile test of two sheets was conducted by overlapping and adhering a 10 mm×25 mm face of two square sheets having one side of 25 mm and a thickness of 5 mm.

3. In a T-peel test, a peel test was conducted on a T-shape of the non-adhered sections of two sheets by overlapping and adhering a 20 mm×25 mm face of two sheets having one side of 25 mm and a thickness of 5 mm.

In tests 1, 2, and 3 above, test pieces which had toluene applied to the adhesive faces, were stuck together manually and left overnight at 23° C. were used.

Examples 1-10

A hydrogenated block copolymer SEEPS (SEPTON4055, manufactured by Kuraray Co., Ltd.) which satisfies the condition of the present invention was used, kneading was performed with the composition shown in Table 1, and an assessment of the physical properties of the thermoplastic resin composition obtained was performed. Table 1 shows the composition of the thermoplastic resin composition. Physical property measurement results are shown in Table 2.

Example 11

A hydrogenated block copolymer SEEPS (SEPTON4033, manufactured by Kuraray Co., Ltd.) which satisfies the condition of the present invention was used, kneading was performed with the composition shown in Table 1, and an assessment of the physical properties of the thermoplastic resin composition obtained was performed. Table 1 shows the composition of the thermoplastic resin composition. Physical property measurement results are shown in Table 2.

Examples 12-15

A hydrogenated block copolymer SEEPS (SEPTON-J3341, manufactured by Kuraray Co., Ltd.) which satisfies the condition of the present invention was used, kneading was performed with the composition shown in Table 1, and an assessment of the physical properties of the thermoplastic resin composition obtained was performed. Table 1 shows the composition of the thermoplastic resin composition. Physical property measurement results are shown in Tables 2 and 3.

Reference Examples 1-4

Using a fresh heart of a pig, which is a living organ for training use, the above physical properties were measured for each area shown in Table 3, along the directions shown in Table 3. Right cardiac muscle/fiber perpendicular means that a physical properties measurement of the right ventricle cardiac muscle of a heart of a pig was performed along the perpendicular direction to the muscle fiber. Right cardiac muscle/fiber parallel means that a physical properties measurement of the right ventricle cardiac muscle of a heart of a pig was performed along the parallel direction to the muscle fiber. Aorta/perpendicular means that a physical properties measurement of the aorta of a heart of a pig was performed along the perpendicular direction to the aorta. Aorta/cross-section means that a physical properties measurement of the aorta of a heart of a pig was performed along the cross-sectional direction of the aorta. The results are shown in Table 3.

Comparative Examples 1 and 2

Apart from using, as a comparison component (A), SEPS (SEPTON2007, manufactured by Kuraray Co., Ltd.) which is a hydrogenated block copolymer that does not satisfy the conditions of the present invention, kneading was conducted under the same conditions and on the same compositions as those of Example 1 and Example 7. SEPTON2007 is supplied as pellets, so absorbing oil therein in advance is difficult, and therefore was rendered into a form in which oil is easily absorbed by first dissolving the SEPTON2007 in hot toluene, then gradually introducing the toluene solution into a great excess of rapidly churning methanol and precipitating the methanol to form amorphous polymer particles (crumbs). Oil was added to this and left for a week, but the oil was not completely absorbed. At this point, the resin component and the oil which was not absorbed were kneaded by (2) Kneading Method mentioned above. The resin composition obtained had severe bleed out (leakage) of oil and was not suitable for actual use, and since the precise blending composition was unclear, no measurement of physical properties was performed.

Comparative Example 3

The physical properties measurement values of the post-curing urethane resin (polyurethane) used in current models of a heart are shown in Table 3.

TABLE 1

| | Hydrogenated block copolymer SEPTON4055 | Hydrogenated block copolymer SEPTON4033 | Hydrogenated block copolymer SEPTON-J3341 | Hydrogenated block copolymer SEPTON2007 | Paraffin oil (PW-90) | Cross copolymer | Homo PP (J106G) | Calcium carbonate (NS #100) | PE Fiber (FDSS-2) | Vinylon fiber |
|---|---|---|---|---|---|---|---|---|---|---|
| Example 1 | 100 | — | — | — | 300 | — | — | — | — | — |
| Example 2 | 100 | — | — | — | 200 | — | — | — | — | — |
| Example 3 | 100 | — | — | — | 100 | — | — | — | — | — |
| Example 4 | 100 | — | — | — | 300 | — | 30 | — | — | — |
| Example 5 | 100 | — | — | — | 300 | — | 20 | — | — | — |
| Example 6 | 100 | — | — | — | 300 | — | 10 | — | — | — |
| Example 7 | 100 | — | — | — | 300 | 40 | — | — | — | — |
| Example 8 | 100 | — | — | — | 300 | — | — | 120 | — | — |
| Example 9 | 100 | — | — | — | 300 | — | — | 40 | — | — |
| Example 10 | 100 | — | — | — | 500 | 15 | — | — | — | — |
| Example 11 | — | 100 | — | — | 300 | — | — | — | — | — |
| Example 12 | — | — | 100 | — | 300 | 20 | — | — | — | — |
| Example 13 | — | — | 100 | — | 300 | — | — | — | 20 | — |
| Example 14 | — | — | 100 | — | 300 | — | — | — | 40 | — |
| Example 15 | — | — | 100 | — | 300 | — | — | — | — | 20 |
| Comparative Example 1 | — | — | — | 100 | 300 | — | — | — | — | — |
| Comparative Example 2 | — | — | — | 100 | 300 | 40 | — | — | — | — |
| Comparative Example 3 | — | — | — | — | — | — | — | — | — | — |

The unit of Table 1 is parts by mass.

TABLE 2

| Example/ Comparative Example | E hardness | Tensile elasticity (MPa) | 50% modulus (MPa) | Thread tearing strength (N) | Thread tearing elongation (mm) | Residual stress after spring back test (%) | Texture evaluation Texture sense test Total score | Texture evaluation Maximum static friction force gf | Texture evaluation Static friction coefficient (ratio between maximum static frictional force and load) |
|---|---|---|---|---|---|---|---|---|---|
| Example 1 | 12 | 0.09 | 0.02 | 3.5 | 121 | 0 | 4 | 92 | 9.2 |
| Example 2 | 24 | 0.25 | 0.09 | 7.1 | 120 | 4 | 4 | 130 | 13.0 |
| Example 3 | 46 | 0.70 | 0.23 | 8.7 | 47 | 0 | 4 | 47 | 4.7 |
| Example 4 | 45 | 0.42 | 0.16 | 6.3 | 36 | 12 | 5 | 124 | 12.4 |
| Example 5 | 32 | 0.29 | 0.10 | 4.5 | 31 | 8 | 4 | 116 | 11.6 |
| Example 6 | 21 | 0.15 | 0.04 | 4.0 | 30 | 0 | 4 | 97 | 9.7 |
| Example 7 | 23 | 0.18 | 0.06 | 7.1 | 108 | 0 | 7 | 201 | 20.1 |
| Example 8 | 18 | 0.15 | 0.05 | 8.8 | 137 | 15 | 6 | 123 | 12.3 |
| Example 9 | 19 | 0.14 | 0.05 | 6.7 | 113 | 4 | 7 | 198 | 19.8 |
| Example 10 | 6 | 0.03 | 0.03 | 7.3 | 207 | 0 | 7 | 167 | 16.7 |
| Example 11 | 22 | 0.14 | 0.05 | 3.2 | 29 | 0 | 4 | 128 | 12.8 |
| Example 12 | 11 | 0.07 | 0.03 | 3.5 | 67 | 0 | 7 | 165 | 16.5 |

TABLE 3

| Example/ Comparative Example | E hardness | Tensile elasticity (MPa) | 50% modulus (MPa) | Thread tearing strength (N) | Thread tearing elongation (mm) | Residual stress after spring back test (%) | Texture evaluation Texture sense test Total score | Texture evaluation Maximum static friction force gf | Texture evaluation Static friction coefficient (ratio between maximum static frictional force and load) |
|---|---|---|---|---|---|---|---|---|---|
| Example 13 | 26 | 0.20 | 0.07 | 3.5 | 20 | 12 | 6 | 148 | 14.8 |
| Example 14 | 43 | 0.69 | 0.18 | 3.7 | 15 | 12 | 4 | 90 | 9.0 |
| Example 15 | 40 | 0.82 | 0.28 | 4.7 | 24 | 6 | 7 | 180 | 18.0 |
| Comparative Example 1 | severe bleed out (leakage) of oil, not measured | | | | | | | | |
| Comparative Example 2 | severe bleed out (leakage) of oil, not measured | | | | | | | | |

TABLE 3-continued

| Example/Comparative Example | E hardness | Tensile elasticity (MPa) | 50% modulus (MPa) | Thread tearing strength (N) | Thread tearing elongation (mm) | Residual stress after spring back test (%) | Texture evaluation | | |
|---|---|---|---|---|---|---|---|---|---|
| | | | | | | | Texture sense test Total score | Maximum static friction force gf | Static friction coefficient (ratio between maximum static frictional force and load) |
| Comparative Example 3 Polyurethane | 24 | 0.20 | 0.07 | 2.0 | 19 | 16 | 4 | 21 | 2.1 |
| Reference example 1 Pig heart Right cardiac muscle/fiber perpendicular | 14 | 0.17 | 0.11 | 3.4 | 29 | 8 | Not measured | Not measured | Not measured |
| Reference example 2 Pig heart Right cardiac muscle/fiber parallel | 20 | 0.21 | 0.17 | 3.3 | 25 | 3 | Not measured | Not measured | Not measured |
| Reference example 3 Pig heart Aorta/perpendicular | 25 | 0.30 | 0.20 | 11.0 | 33 | 0 | Not measured | Not measured | Not measured |
| Reference example 4 Pig heart Aorta/cross-section | 17 | 0.16 | 0.08 | 9.2 | 41 | 6 | Not measured | Not measured | Not measured |

From the results shown in Tables 2 and 3, all of the thermoplastic resin compositions for an organ model obtained in the examples which satisfy the components and compositions of the present invention are thermoplastic resin compositions for an organ model which have a softness (E hardness, tensile elasticity, 50% modulus) and texture close to those of an organ, have high mechanical strength (thread tearing strength, thread tearing elongation), have excellent durability, and can be handled easily. The resin of Comparative Example 3 has a low mechanical strength (thread tearing strength, thread tearing elongation) and problems in durability.

Moreover, in addition to softness and mechanical strength, Example 7, Example 10, and Example 12 which satisfy the most preferred range defined in the present invention regarding the blending of the cross copolymer which is component (C) also satisfy the preferred conditions of texture evaluation (texture sense test and static friction coefficient).

Moreover, in addition to softness and mechanical strength, Example 9 which satisfies the most preferred range defined in the present invention regarding the blending of the inorganic filler which is component (E-1) also satisfies the preferred conditions of texture evaluation.

Moreover, in addition to softness and mechanical strength, Example 13 and Example 15 which satisfy the most preferred range defined in the present invention regarding the blending of the organic fibrous filler which is component (E-2) also satisfy the preferred conditions of texture evaluation.

Example 16, Adhesiveness Test of the Sheet

Table 4 shows the adhesiveness test results for the sheet. The resin composition sheet of Example 11 was used as the sheet. The resin composition sheet of the present invention can demonstrate sufficient practical adhesive strength only by applying a toluene solvent to adhesive faces and sticking together. Meanwhile, the post-curing urethane resin (polyurethane) of the comparative example cannot be adhered by such a method.

TABLE 4

| Example 16 | ① Edge face adhesion test | ② Shear strength test | ③ T-peel test |
|---|---|---|---|
| Resin sheet of Example 11 | 18 N | Material destruction: Destructed at other parts than the adhered surface | 5 N |
| Polyurethane of Comparative Example 3 | Not adhered | Not adhered | Not adhered |

Material destruction of Table 4 refers to destruction of the material.

An injection molding mold was created from organ (heart) 3D data downloaded from the above-mentioned site, and a right atrium and a right ventricle organ model including superior vena cava, inferior vena cava, and arteria pulmonalis were molded by injection molding using the resin composition of Example 12. A cut was made from a vein to the ventricle, and arteria pulmonalis to remove the inner mold. When removing, it was possible to remove the inner mold without any further tearing of the cut-out edge due to stress. Moreover, the right atrium, right ventricle organ model was created by re-adhering by applying toluene to the cut-out surface and contacting.

Accordingly, the thermoplastic resin composition for organ model of the present examples can suitably be used in surgical practice using a surgical resection tool and surgical practice such as clipping. The thermoplastic resin composition for an organ model of the present examples is suitable as a thermoplastic resin composition for an organ model for practice that can be repeatedly used to some extent.

The invention claimed is:

1. A resin composition for an organ model,
wherein said composition contains, as component (A), 100 parts by mass of a hydrogenated block copolymer having an MFR measured at a temperature of 230° C. and a load of 2.16 kg of 1 g/10 min. or less, and as component (B), 100 parts by mass or more and 1,000 parts by mass or less of an oil, wherein said composition further contains, as component (E1), 10 parts by mass or more and 100 parts by mass or less of an inorganic filler and/or, as component (E2), 10 parts by mass or more and 30 parts by mass or less of an organic fibrous filler, and
wherein the hydrogenated block copolymer is a hydrogenated product of an aromatic vinyl-conjugated diene block copolymer,
the inorganic filler comprises at least one selected from the group consisting of calcium carbonate, talc, clay, calcium silicate, magnesium carbonate, magnesium hydroxide, mica, barium sulfate, titanium oxide, aluminum hydroxide, silica, alumina, and carbon black, and
the organic fibrous filler comprises at least one selected from the group consisting of conductive fillers, carbon fibers, carbon nanofibers, carbon nanotubes, coil-shaped carbon fibers, polyethylene fibers, polypropylene fibers, polyvinyl alcohol fibers, VINYLON fibers, nylon fibers, cellulose fibers, wood powder and wood pulp.

2. The resin composition for an organ model according to claim 1, wherein said composition further contains, as component (C), 10 parts by mass or more and 200 parts by mass or less of a cross copolymer.

3. The resin composition for an organ model according to claim 1, wherein said composition further contains, as component (D), a polypropylene resin.

4. The resin composition for an organ model according to claim 1, wherein the resin composition for an organ model is a thermoplastic resin composition.

5. The resin composition for an organ model according to claim 1, wherein the resin composition is for a heart model, for a liver model, or for a pancreas model.

6. A resin composition for an organ model,
wherein said composition contains, with respect to 100 parts by mass of a hydrogenated block copolymer as component (A), 100 parts by mass or more and 1,000 parts by mass or less of an oil as component (B), and further comprises one or a plurality of components selected from components (E-1) and (E-2) below:
as component (E-1), 10 parts by mass or more and 100 parts by mass or less of an inorganic filler; and
as component (E-2), 10 parts by mass or more and 30 parts by mass or less of an organic fibrous filler, and
wherein the hydrogenated block copolymer is a hydrogenated product of an aromatic vinyl-conjugated diene block copolymer,
the inorganic filler comprises at least one selected from the group consisting of calcium carbonate, talc, clay, calcium silicate, magnesium carbonate, magnesium hydroxide, mica, barium sulfate, titanium oxide, aluminum hydroxide, silica, alumina, and carbon black, and
the organic fibrous filler comprises at least one selected from the group consisting of conductive fillers, carbon fibers, carbon nanofibers, carbon nanotubes, coil-shaped carbon fibers, polyethylene fibers, polypropylene fibers, polyvinyl alcohol fibers, VINYLON fibers, nylon fibers, cellulose fibers, wood powder and wood pulp.

7. An organ model using the resin composition for an organ model according to claim 1.

* * * * *